US010599457B2

(12) United States Patent
Simoncelli

(10) Patent No.: US 10,599,457 B2
(45) Date of Patent: Mar. 24, 2020

(54) IMPORTING AND EXPORTING VIRTUAL DISK IMAGES

(71) Applicant: Red Hat, Inc., Raleigh, NC (US)

(72) Inventor: Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 226 days.

(21) Appl. No.: 14/189,783

(22) Filed: Feb. 25, 2014

(65) Prior Publication Data
US 2015/0244802 A1    Aug. 27, 2015

(51) Int. Cl.
*H04L 29/08*     (2006.01)
*G06F 9/455*     (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,058,696 B1 * | 6/2006 | Phillips | ............... | G06F 16/10 709/217 |
| 7,743,031 B1 * | 6/2010 | Cameron | ............. | G06F 3/0611 707/649 |
| 8,135,930 B1 * | 3/2012 | Mattox | ............... | G06F 9/45558 711/100 |
| 8,346,727 B1 * | 1/2013 | Chester | ................ | G06F 16/188 707/640 |
| 8,635,429 B1 * | 1/2014 | Naftel | ................ | G06F 11/1446 711/206 |
| 8,706,991 B2 * | 4/2014 | Colbert | ................ | G06F 3/0617 711/162 |
| 8,943,203 B1 * | 1/2015 | Lent | ..................... | G06F 9/4868 709/226 |
| 8,972,351 B1 * | 3/2015 | Kumar | ................. | G06F 16/128 707/639 |
| 2006/0013222 A1 * | 1/2006 | Rangan | ................ | G06F 3/0605 370/389 |
| 2009/0055447 A1 * | 2/2009 | Sudhakar | ............. | G06F 3/0613 |
| 2009/0125904 A1 * | 5/2009 | Nelson | ............... | G06F 9/45558 718/1 |
| 2009/0204759 A1 * | 8/2009 | Seaman | ............... | G06F 3/0605 711/114 |
| 2010/0011178 A1 * | 1/2010 | Feathergill | ......... | G06F 11/1466 711/162 |
| 2010/0107163 A1 * | 4/2010 | Lee | ..................... | G06F 9/45533 718/1 |

(Continued)

*Primary Examiner* — Clayton R Williams
*Assistant Examiner* — Christopher B Robinson
(74) *Attorney, Agent, or Firm* — Lowenstein Sandler LLP

(57) ABSTRACT

A processing device receives a first command to export a first virtual image to a server, wherein the first virtual disk image comprises a plurality of volumes that comprise a read-only base volume and at least one additional volume that comprises changes to the base volume. The processing device generates a map of the first virtual disk image, wherein the map identifies, for each offset in the first virtual disk image, which of the plurality of volumes contains most recent data for the offset. The processing device uses the map to read data at offsets of the virtual disk image from the plurality of volumes. The processing device transmits the data to the server.

17 Claims, 7 Drawing Sheets

(56) References Cited

U.S. PATENT DOCUMENTS

| | | | |
|---|---|---|---|
| 2011/0071983 A1* | 3/2011 | Murase | G06F 9/5088 |
| | | | 707/649 |
| 2012/0005673 A1* | 1/2012 | Cervantes | G06F 9/45558 |
| | | | 718/1 |
| 2013/0073825 A1* | 3/2013 | Terayama | G06F 3/0607 |
| | | | 711/165 |
| 2013/0151802 A1* | 6/2013 | Bahadure | G06F 3/0605 |
| | | | 711/162 |
| 2014/0115175 A1* | 4/2014 | Lublin | G06F 9/4856 |
| | | | 709/228 |

* cited by examiner

IMPORTING AND EXPORTING VIRTUAL DISK IMAGES

TECHNICAL FIELD

Embodiments of the present invention relate to virtual machines, and more specifically to importing virtual disk images from a server and exporting virtual disk images to the server.

BACKGROUND

There are many different solutions for managing and using virtual disk images. Some solutions such as oVirt™ and VMware® vSphere® provide reliability assurances, repair errors to virtual machines, and may treat each virtual machine as a unique resource. Other solutions such as OpenStack™ treat virtual machines as fungible commodities, where a new virtual machine may be started and used to replace a failed virtual machine, for example, rather than attempting to recover the failed virtual machine. Often entities would like to use a first virtual machine management solution in some instances and another virtual machine management solution in other instances.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for importing and exporting virtual disk images by a first virtual machine management system. The first virtual machine management system may import and export the virtual disk images to a second virtual machine management system that might implement, manage and/or handle virtual machines in a different manner than the first virtual machine management system. Embodiments enable disparate virtual machine management systems to communicate and loosely integrate with one another, facilitating cross system use of virtual disk images. For example virtual disk images may be generated by a first virtual machine management system, and be copied to a second virtual machine management system. The virtual disk images may be modified by the second virtual machine management system, and then later copied back to the first virtual machine management system. Such cross system sharing of virtual machines can be useful for system administrators that use, for example, both oVirt and Openstack virtual machine management systems.

In one embodiment, to import a selected virtual disk image a virtual machine manager first retrieves metadata for the virtual disk image. The metadata may include information such as an image size, an image name, an image file type, and so forth. The virtual machine manager creates a volume for the virtual disk image using the metadata and then downloads data for the virtual disk image and inserts that data into the volume. In some instances the virtual machine manager downloads a specific portion of the virtual disk image that includes a header of the virtual disk image. The virtual machine manager may then determine a virtual size of the virtual disk image and use this for the created volume.

In one embodiment, to export a selected virtual disk image a virtual machine manager generates a map of the virtual disk image that identifies volumes that hold current information for the different offsets of the virtual disk image. A volume may be, for example, a file or a block device. The virtual machine manager may then use the map to read data for the offsets into a buffer, then compress and stream the data. The virtual machine manager may also perform other operations such as encryption. Accordingly, a virtual disk image with one or multiple snapshots may be converted into a virtual disk image with a single volume and compressed and streamed to a recipient on the fly. This may facilitate the exchange of virtual disk images between virtual machine management systems.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

Figure 1:
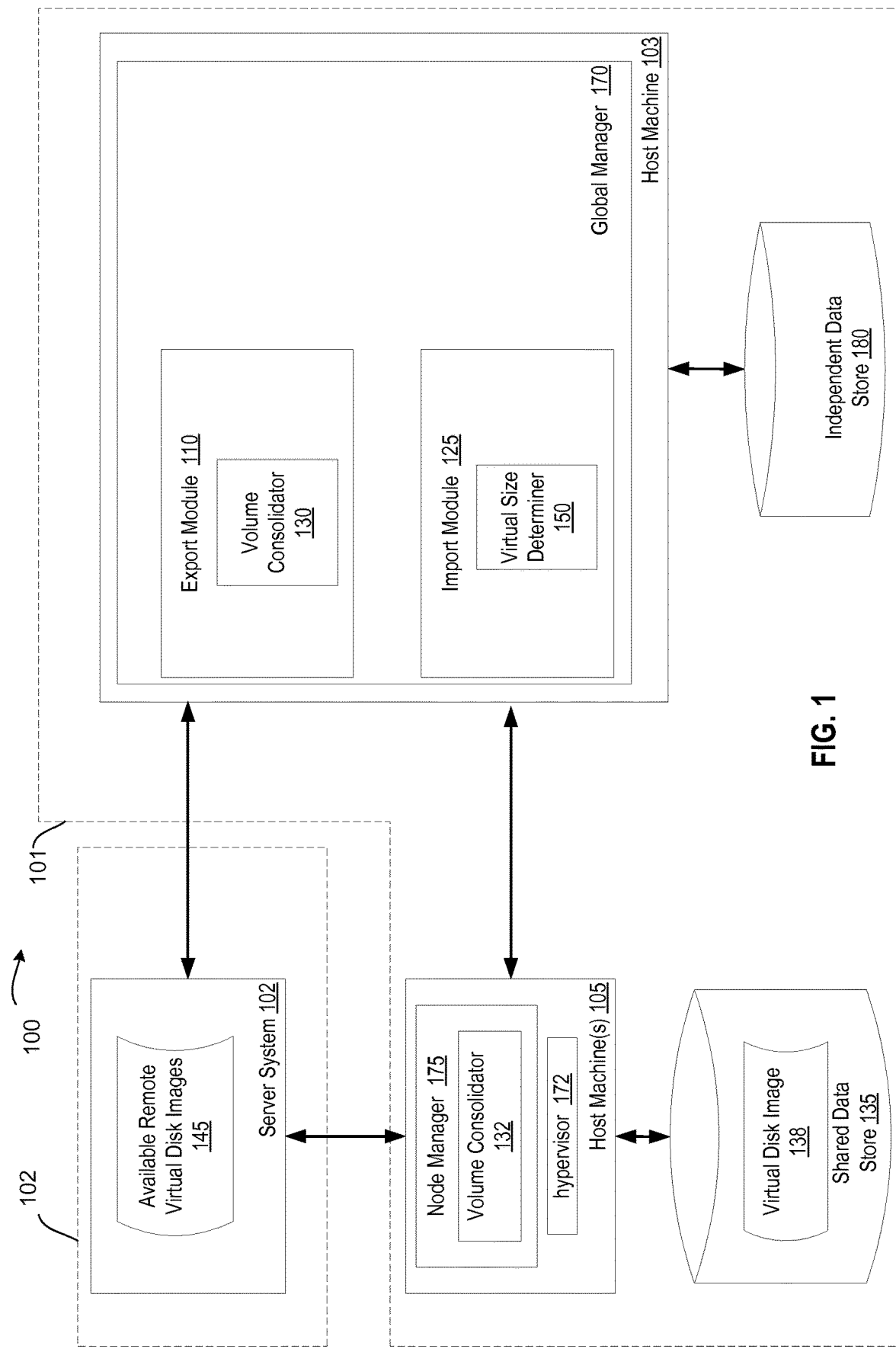
FIG. 1 is a block diagram of a network architecture for a virtual machine management system, in accordance with one implementation.

FIG. 1 is a block diagram of a network architecture 100 of a first virtual machine management system 101 connected with a second virtual machine management system 102, in accordance with one implementation. Machines in the first virtual machine management system 101 may be connected to machines in the second virtual machine management system 102 via a network (not shown). The network may include a private network (e.g., a local area network (LAN), wide area network (WAN), intranet, etc.) and/or a public network (e.g., the Internet). Additionally, machines (e.g., host machines 103, 105 within the first virtual machine management system 101) may be connected via the network or via a different network.

The host machines 103, 105 may be computer systems that run and/or manage virtual machines. One example host machine is illustrated and discussed in greater detail with reference to FIG. 2. Host machines may have independent data stores (e.g., independent data store 180) and/or may have access to a shared data store (e.g., shared data store 135). Data stores may include internal or external disk drives, solid state drives (SSDs) and/or other persistent storage devices that are connected to individual host machines or a network. Some or all of the host machines 103, 105 may be arranged into one or more clusters. A shared data store 135 may be a network attached storage (NAS), storage area network (SAN), cloud storage, or other shared storage that is accessible to multiple host machines in a cluster.

Host machine 103 includes a global manager 170. The global manager 170 may be a virtualization management application that manages hardware nodes (host machines 105), storage and network resources. The global manager 170 deploys and monitors virtual machines (VMs) running in a data center. The global manager 170 may provide a user interface that enables an administrator to view and manage all aspects of a data center. Additionally, the global manager 170 may perform such actions as migrating virtual machines between host machines, configuring new host machines to act as nodes in the virtual management system 101, managing loads and resource utilization on host machines and virtual machines, managing resource quotas (e.g., storage quotas), and so on.

The first VM management system 101 may include multiple host machines 105, which may be arranged in one or more clusters. Each host machine 105 may include a node manager 175 that manages a hypervisor 172 running on the host machine 105 and that further interfaces with the global manager 170. The node manager 175 may load new virtual machines onto the hypervisor 172, coordinate with other node managers to migrate VMs, and perform other operations with respect to the virtual machines and hypervisor 172 running on a same host machine as the node manager 175.

In one embodiment, global manager 170 includes an export module 110 and an import module 125. Export module 110 manages operations associated with exporting virtual disk images (e.g., virtual disk image 138) out of the first virtual machine management system 101 (e.g., into second virtual machine management system 102). For virtual disk images that include a single volume, exporting the virtual disk image may include queuing the virtual disk image to a server system 102 (e.g., of the second VM management system 102) and then uploading the virtual disk image to the server system 102. In one embodiment the export module 110 selects a node manager 175 of a host machine 105 and instructs the node manager to upload the virtual disk image 138 to the server system 102.

For virtual disk images that include multiple volumes (e.g., for which multiple different snapshots or point-in-time images have been generated), additional steps may be performed to export the virtual disk image. For such virtual disk images, a volume consolidator 130 of the export module 110 may consolidate the multiple volumes into a single volume for upload. To consolidate the multiple volumes of a virtual disk image 138, volume consolidator 130 may generate a map. The map may identify, for each offset of the virtual disk image, which of the multiple volumes contains up-to-date data for that offset. Alternatively, no map may be generated. In such an instance the volume consolidator 130 would search through the volumes of the virtual disk image for each offset to identify the appropriate volume to use for that offset.

The export module 110 may then load data for offsets of the virtual disk image from appropriate volumes into a buffer. If a map was generated then the map may be used to facilitate the loading of data for the offsets of the virtual disk image from appropriate volumes into the buffer. The buffer may be a volatile memory. In one embodiment, volume consolidator 130 generates a temporary area in the buffer and populates the temporary area with the data for the offsets from the appropriate volumes. When the temporary area in the buffer is populated with a threshold amount of data, the data may be compressed (and/or encrypted) and then streamed to the server system 102. Export module 110 may begin transmission of compressed (and/or encrypted) data for a virtual disk image 138 before the virtual disk image has been fully compressed, and thus before a compressed file size for the virtual disk image is known.

In one embodiment, export module 110 selects a node manager 175 for a host machine 105, and instructs the node manager 175 to upload the multi-volume virtual disk image to the server system. Some or all of the generation of the map, generation of the temporary area, buffering of data, compressing (and/or encrypting) of data and/or streaming of data may be performed by the node manager 175 responsive to the instructions from the export module 110. In one embodiment, the node manager 175 includes a volume consolidator 132 that performs one or more of the generation of the map, generation of the temporary area, buffering, compressing (and/or encryptiong) and/or streaming. The operations associated with export of a virtual disk image are described more fully with reference to FIG. 4.

Import module 125 manages operations associated with importing virtual machine images into the first virtual machine management system 101 (e.g., from second virtual machine management system 102). To import a virtual disk image, the import module 125 retrieves a list of available remote virtual disk images 145 (e.g., from server system 102). The import module 125 may then receive a selection of a particular available virtual disk image, and may download metadata for the selected virtual disk image from the server system 102. Import module 125 may use the metadata to generate a volume. Import module 125 may then download the data for the virtual disk image and insert that data into the generated volume. In one embodiment, import module 125 directs a node manager 175 to generate the volume, download the data, and/or insert the data into the volume.

Virtual disk images include an image size and a virtual size. The image size corresponds to the amount of storage space that is actually used by the virtual disk image (e.g., the file size of the virtual disk image). The virtual size corresponds to a disk size that is read by guest software that runs in a virtual machine that loads the virtual disk image. Some virtual disk images such as those having a RAW disk format or an ISO disk format may have an image size that is the same as the virtual size. Other virtual disk images have a virtual size that is larger than the image size. Some examples of virtual disk image formats that support sparseness, and thus virtual disk images with larger virtual sizes than image sizes, include QCOW, QCOW2, VHD, VMDK, VDI, AKI, ARI, and AMI. In some instances the virtual size may be much larger than the image size (e.g., an image size of 1 GB and a virtual size of 20 GB).

The virtual size is useful in the creation of a virtual disk image. However, metadata that is retrieved for a selected virtual disk image may not include the virtual size for that virtual disk image. To determine the virtual size, a virtual size determiner 150 of the import module 125 may download a specific portion of the data for the virtual disk image (e.g., a specified number of bytes at particular offsets such as the first 72 bytes). The specific portion of the data that is downloaded may include a header for the virtual disk image, and one of the items of information in the header may be the virtual size. The virtual size determiner 150 may then read the header to determine the virtual size. The import module 125 may use the virtual size for the generation of the volume or to update the volume (if it has already been created). The operations associated with import of a virtual disk image are described more fully with reference to FIG. 3.

Figure 2:
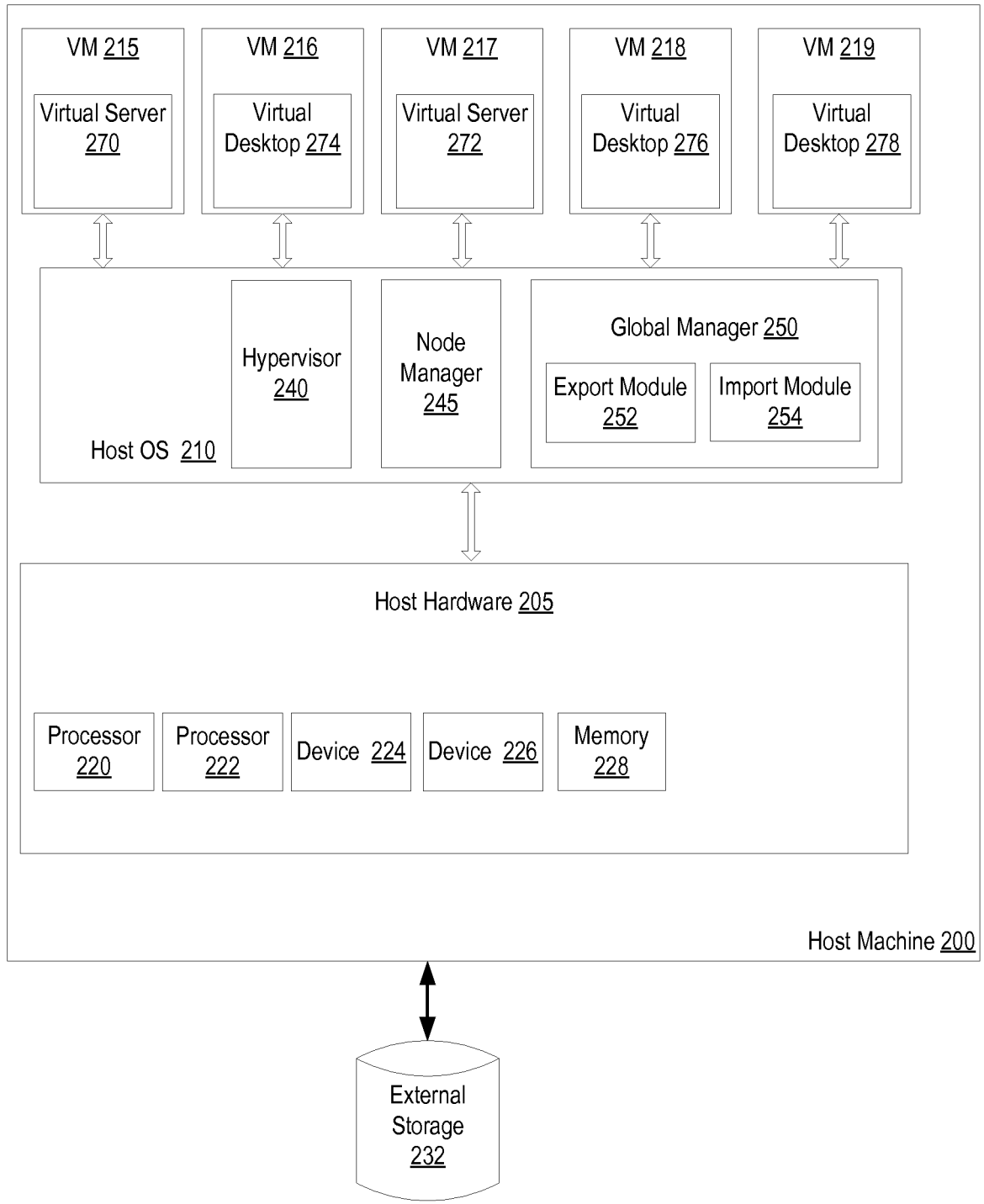
FIG. 2 is a block diagram of a virtual appliance router, in accordance with one embodiment of the present invention.

FIG. 2 is a block diagram that illustrates an embodiment of a computer system (referred to herein as a host machine 200) that hosts one or more virtual machines (VMs) 215-

219. The host machine 200 may be a rackmount server, a workstation, a desktop computer, a notebook computer, a tablet computer, a mobile phone, a palm-sized computing device, a personal digital assistant (PDA), etc. The host machine 200 includes host hardware 205, which may include multiple processors 220, 222, multiple devices 224, 226, memory 228, and other hardware components. The memory 228 may include volatile memory devices (e.g., random access memory (RAM)), non-volatile memory devices (e.g., flash memory), and/or other types of memory devices. The host hardware 205 may also be coupled to external storage 232 via a direct connection or a network. The host machine 200 may be a single machine or multiple host machines arranged in a cluster.

Each of the devices 224, 226 may be a physical device that is internal or external to the host machine 200. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 232), external I/O devices, etc.

The host machine 200 includes a hypervisor 240 (also known as a virtual machine monitor (VMM)). In one embodiment (as shown) hypervisor 240 is a component of a host operating system (OS) 210. Alternatively, the hypervisor 240 may run on top of a host OS 210, or may run directly on host hardware 205 without the use of a host OS 210.

The hypervisor 240 may manage system resources, including access to memory 228, devices 224, 226, secondary storage, and so on. Alternatively, hypervisor 240 may rely on the host OS 210 to manage the system resources. The hypervisor 240, though typically implemented in software, may emulate and export a bare machine interface (host hardware 205) to higher level software. Such higher level software may comprise a standard or real-time operating system (OS), may be a highly stripped down operating environment with limited operating system functionality, may not include traditional OS facilities, etc. The hypervisor 240 presents to other software (i.e., "guest" software) the abstraction of one or more virtual machines (VMs) 215-219, which may provide the same or different abstractions to various guest software (e.g., guest operating system, guest applications, etc.).

The host machine 200 hosts any number of virtual machines (VM) 215-219 (e.g., a single VM, one hundred VMs, etc.). A virtual machine 215-219 is a combination of guest software that uses an underlying emulation of host machine 200 (e.g., as provided by hypervisor 240). Each VM 215-219 may include one or multiple virtual components such as virtual processors, virtual memory, virtual devices (e.g., virtual storage), and so forth. Each of these virtual components may map to a hardware component, such as a processor 220, 222, device 224, 226, external storage 232, or memory 228. Virtual machines 215-219 can be, for example, hardware emulation, full virtualization, para-virtualization, and operating system-level virtualization virtual machines. The guest software that runs in a VM 215-219 may include a guest operating system, guest applications, guest device drivers, etc. The virtual machines 215 may have the same or different guest operating systems, such as Windows®, Linux®, Solaris®, etc.

Some virtual machines 215-216 may include guest software that is accessible by clients (e.g., local clients and/or remote clients) to provide services to those clients. For example, VMs 215, 217 includes virtual servers 270, 272 such as a virtual web server, a virtual data storage server, a virtual gaming server, a virtual enterprise application server, etc. A client may connect to a virtual sever 270, 272 to request one or more services provided by the virtual server 270, 272.

Similarly, VMs 216, 218, 219 include a virtual desktop 274, 276, 278. A virtual desktop 274, 276, 278 is a virtualized desktop computer, and thus may include storage, an operating system, applications installed on the operating system (e.g., word processing applications, spreadsheet applications, email applications, etc.), and so on. However, rather than these functions being provided and performed at a client, they are instead provided and performed by a virtual machine 216, 218, 219. A virtual desktop can represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

In one embodiment, host machine 200 includes a node manager 245 and a global manager 250. Node manager 245 may correspond to node manager 175 and global manager 250 may correspond to global manager 170 of FIG. 1. For example, global manager 250 may include an export module 252 that corresponds to export module 110 and an import module 254 that corresponds to import module 125. As illustrated, a single host machine may include both a node manager 245 and a global manager 250. Alternatively, a host machine may include only a node manager 245 or only a global manager 250.

Figure 3:
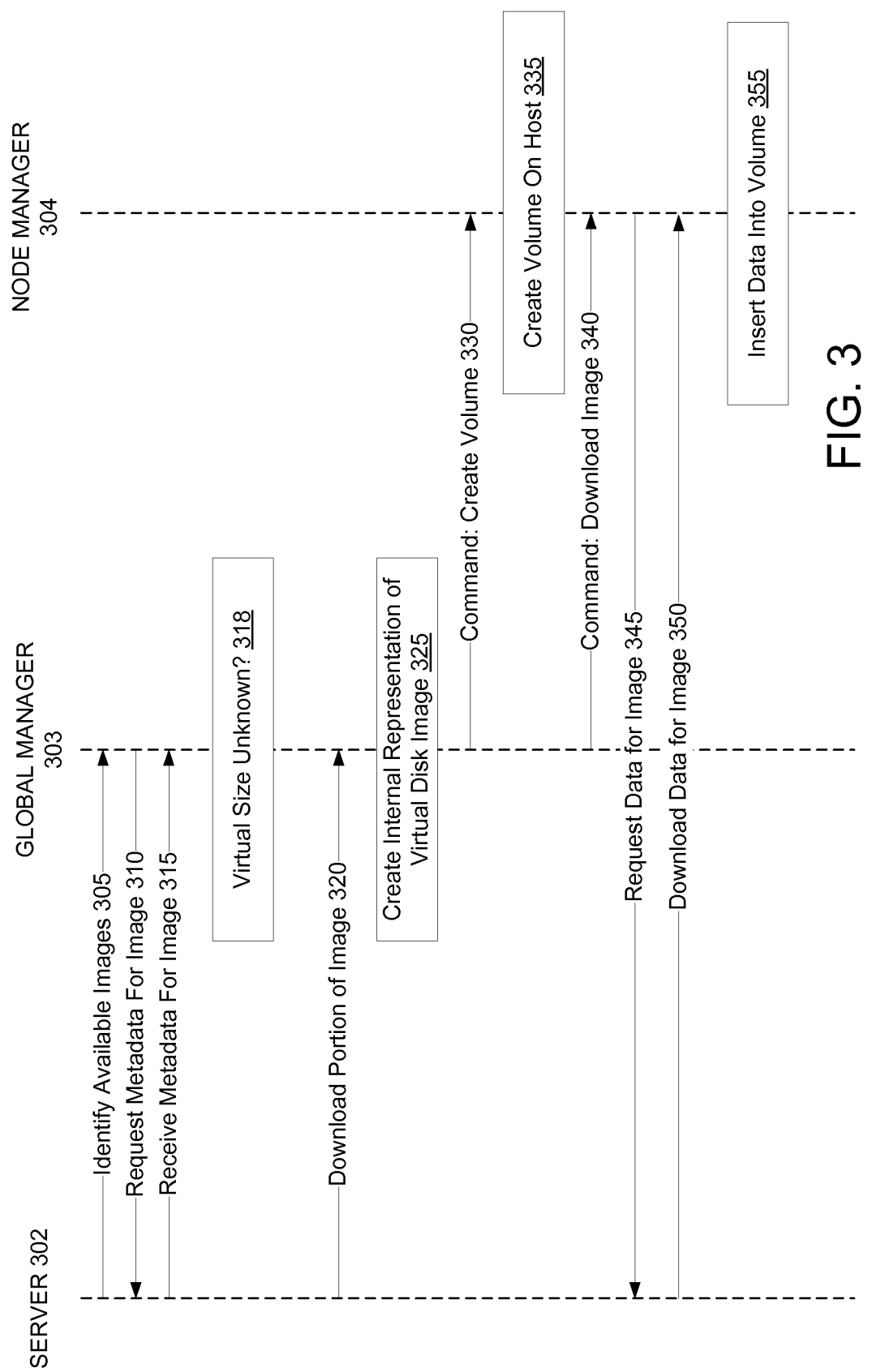
FIG. 3 is a sequence diagram illustrating one embodiment for importing a virtual disk image to a virtual machine management system.

FIG. 3 is a sequence diagram illustrating one embodiment for importing a virtual disk image to a virtual machine management system. The sequence diagram includes a server 302, a global manager 303, and a node manager 304. In one embodiment, the server 302 is a server for a remote VM management system and the global manager 303 and node manager 304 are components of a local VM management system. In one embodiment, a single global manager 303 runs on a host machine in the local VM management system and the node manager 304 is one of multiple node managers in the local VM management system, where each node manager runs on a different host machine. The global manager 303 and node manager 304 may run on the same host machine or on different host machines. In one embodiment, the server 302 is a hypertext transport protocol (HTTP) server with a representational state transfer (REST) interface. In one example the server 302 is an instance of the Openstack image service Glance, which provides discovery, registration and delivery services for virtual disk images in Openstack.

The global manager 303 may first provide credentials to the server 302 to authenticate the global manager 303 to the server 302. This may include providing a username and password, and/or providing other credentials. The server 302 may provide a token to the global manager 303 responsive to the global manger successfully authenticating with the server 302. At block 305, the global manager receives information (e.g., a list) from the server 302 identifying available virtual disk images. The information may be received responsive to a request for a list of available disk images. The global manager selects a particular available virtual disk image. The selection may be performed automatically based on one or more selection rules or may be made by an administrator. At block 310, the global manager 303 requests metadata for the selected virtual disk image. At block 315, the global manager 303 receives the requested metadata.

At block 318, the global manager 303 determines whether the virtual size for the virtual disk image is known or can be determined based on the received metadata. In one embodiment, the global manager determines whether the virtual size is known based on a file type of the virtual disk image. If, for example, the virtual disk image has a RAW disk format, then the virtual size corresponds to the image size (which is included in the received metadata). If, for example, the virtual disk image has a QCOW2 disk format, then the virtual size is likely larger than the image size, and is unknown.

If the global manager cannot determine the virtual size of the virtual disk image based on the metadata, then at block 320 the global manager downloads a specific portion of the virtual disk image. The specific portion of the virtual disk image may be downloaded responsive to a download request sent from the global manager 303 to the server 302. In one embodiment, in which the virtual disk image has the QCOW2 disk format, the global manager downloads a first 72 bytes of the virtual disk image that includes a header for the virtual disk image. For other file formats other specific portions of the virtual disk image that contain a header may be downloaded.

At block 325, the global manager uses the metadata (and potentially the determined virtual size) to generate an internal representation of the virtual disk image. The global manager may maintain a data store such as a database that includes internal representations of all virtual disk images used by the local VM management system.

At block 330, the global manager sends a command to node manager 304 to create a new volume. The command may identify a size for the new volume, which may correspond to the image size of the virtual disk image. The command may also identify other information such as a name, virtual size, and so on. At block 335, the node manager 304 creates the volume. Node manager 304 may or may not notify the global manager 303 when the volume is created.

At block 340, the global manager sends a command to the node manager 304 that causes the node manager to download the data for the virtual disk image from the server 302. The command may identify an address (e.g., an internet protocol (IP) address and port) to download the information from, may identify a name of a virtual disk image to download, and/or may identify which volume to insert the downloaded data into. The command may also include a copy of the token that was provided by the server. At block 345, the node manager 304 requests the data for the image from the server 302. At block 350, the node manager 304 downloads the data for the virtual disk image from the server 302. At block 355, the node manager 355 inserts the downloaded data into the volume 355. In one embodiment, the node manager 304 inserts the data directly into the volume as the data is downloaded.

Figure 4:
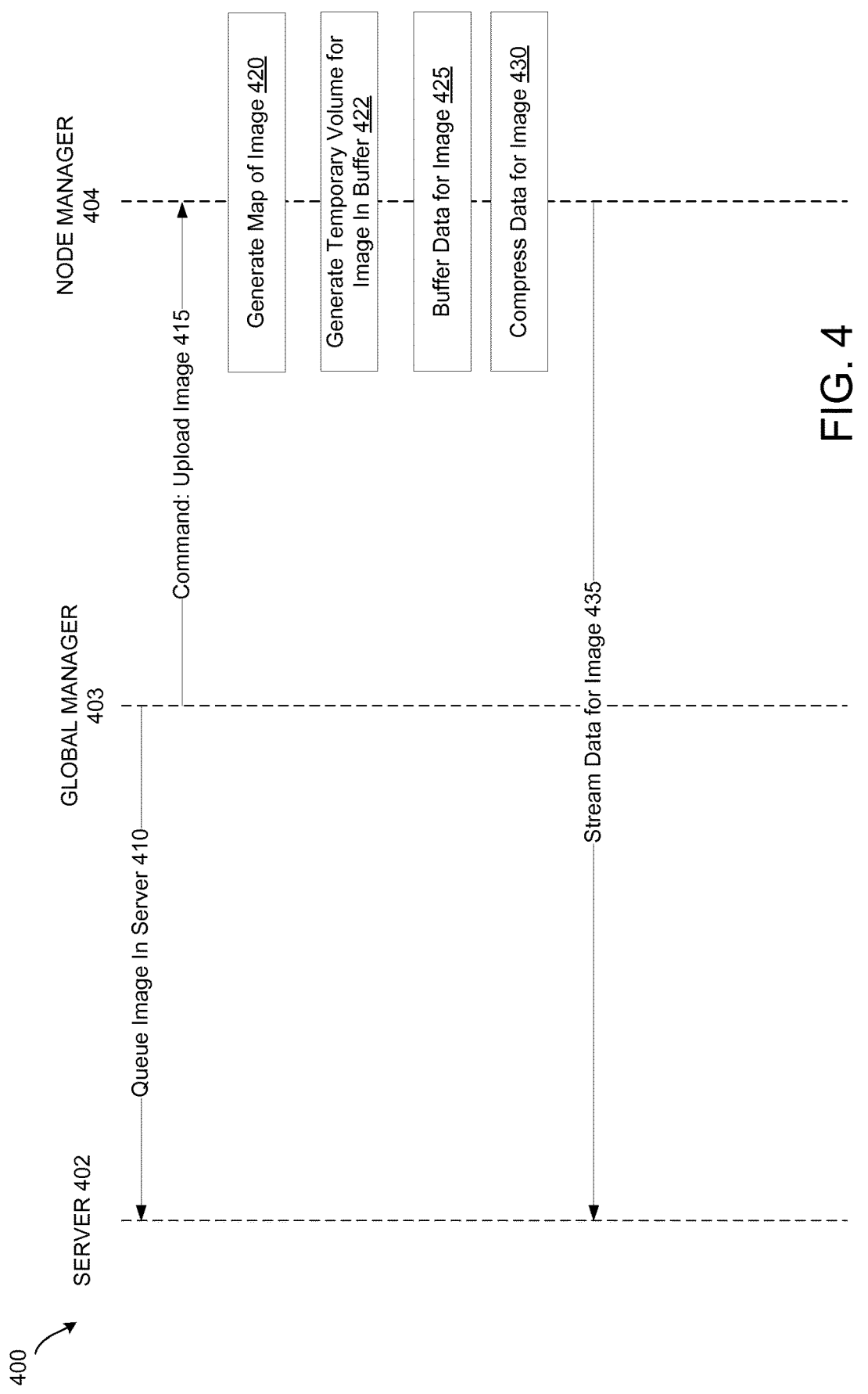
FIG. 4 is a sequence diagram illustrating one embodiment for exporting a virtual disk image from a virtual machine management system.

FIG. 4 is a sequence diagram illustrating one embodiment for exporting a virtual disk image from a virtual machine management system. The sequence diagram includes a server 402, a global manager 403, and a node manager 404. In one embodiment, the server is a server for a remote VM management system and the global manager 403 and node manager 404 are components of a local VM management system.

The global manager 403 may first provide credentials to the server 402 for authentication. Responsive to successful authentication, the server 402 may provide a token to the global manager 403. The global manager 403 may select a virtual disk image to be uploaded to the server. In one embodiment, the global manager 403 automatically selects the virtual disk image based on one or more selection rules. For example, the global manager 403 may select virtual disk images for upload based on timestamps, image names, directories, and so forth. Alternatively, the virtual disk image to be uploaded may be selected by an administrator.

At block 410, the global manager 403 queues the virtual disk image in the server 402. Queuing the virtual disk image may include preparing metadata (e.g., gathering metadata) for the virtual disk image and sending this metadata to the server. Queuing the virtual disk image may additionally include generating or identifying a screenshot for the virtual disk image and sending the screenshot to the server. Once a virtual disk image is queued in the server, the metadata for the virtual disk image is available in the server, but the data for the virtual disk image is not yet available.

At block 415, the global manager 403 issues a command to a node manager 404 to upload the virtual disk image to the server 402. The command may include a copy of the token received from the server 402. The global manager 403 may select a node manager 404 of any available node that has access to the virtual disk image to perform the upload. The command may identify an address of the server, a name of the virtual disk image to be uploaded, and/or other information.

At block 420, the node manager 404 may generate a map of the virtual disk image. The map may identify, for each offset of the virtual disk image, which of multiple volumes contains the most recent information associated with that offset.

The virtual disk image may include multiple different volumes. For example, a virtual disk image may include a base volume and at least one other volume that contains changes to the base volume. For example, a new volume may be created for the virtual disk image each time a snapshot operation is performed. With each snapshot, changes that have been made to the virtual image are written to an active read-write volume, the active read-write volume is transitioned to a read-only volume, and a new read-write volume is created.

When data for a virtual disk image is read, the last volume (generated by the most recent snapshot) is first read to determine if it contains any portion of the data. If the last volume does not contain all of the data, a next previous volume is checked for the data, and so on until a base volume is checked for the data (if the all of the data was not found in any of the other volumes). Data may be read in fixed size blocks, such as in 64 kB blocks, 128 kB blocks, or other sized blocks.

At block 422, the node manager 404 generates a temporary area for the virtual disk image in a buffer. At block 425, the node manager 404 may then begin populating the temporary area in the buffer with data for the virtual disk image. In one embodiment, the node manager 404 populates the data for the virtual disk image in ascending order based on offset in fixed sized blocks or chunks. For example, node manager 404 may first identify which volume contains most current data for the first 64 kB of the virtual disk image, and write the data for the first 64 kB from that volume to the temporary area in the buffer. The node manager 404 may then identify which volume contains the most current data for the second 64 kB block of the virtual disk image, and write the data for the second 64 kB block from that volume to the temporary area in the buffer, and so on. If a map was generated, the map may be used to quickly identify which volume to read for each offset of the virtual disk image. If no map was generated, then the node manager 404 searches through the volumes (in descending order starting from the last volume of the snapshot) to identify which volume contains the latest data or that offset.

At block 430, the node manager 430 begins compressing the data in the temporary area once a threshold amount of data has been added to the buffer. At block 435, the node manager 404 streams the compressed data for the image to the server 402. The node manager 404 may provide the token to the server 402 when the streaming is initiated. The streamed data may include a compressed version of the temporary area in the buffer. The node manager 404 may continue to write data for offsets of the virtual disk image from appropriate volumes into the temporary area, compress the data, and stream the data to the server until all of the data at all of the offsets for the virtual disk image have been streamed to the server 402. In an alternative embodiment, the node manager generates the temporary area in a non-volatile storage rather than a buffer in memory. In such an embodiment, node manager 404 may complete writing to the temporary area, and then transmit the temporary area to the server. The temporary area may or may not be streamed to the server. One advantage of writing to the buffer and streaming the temporary area is that no additional disk space is used.

Figure 5:
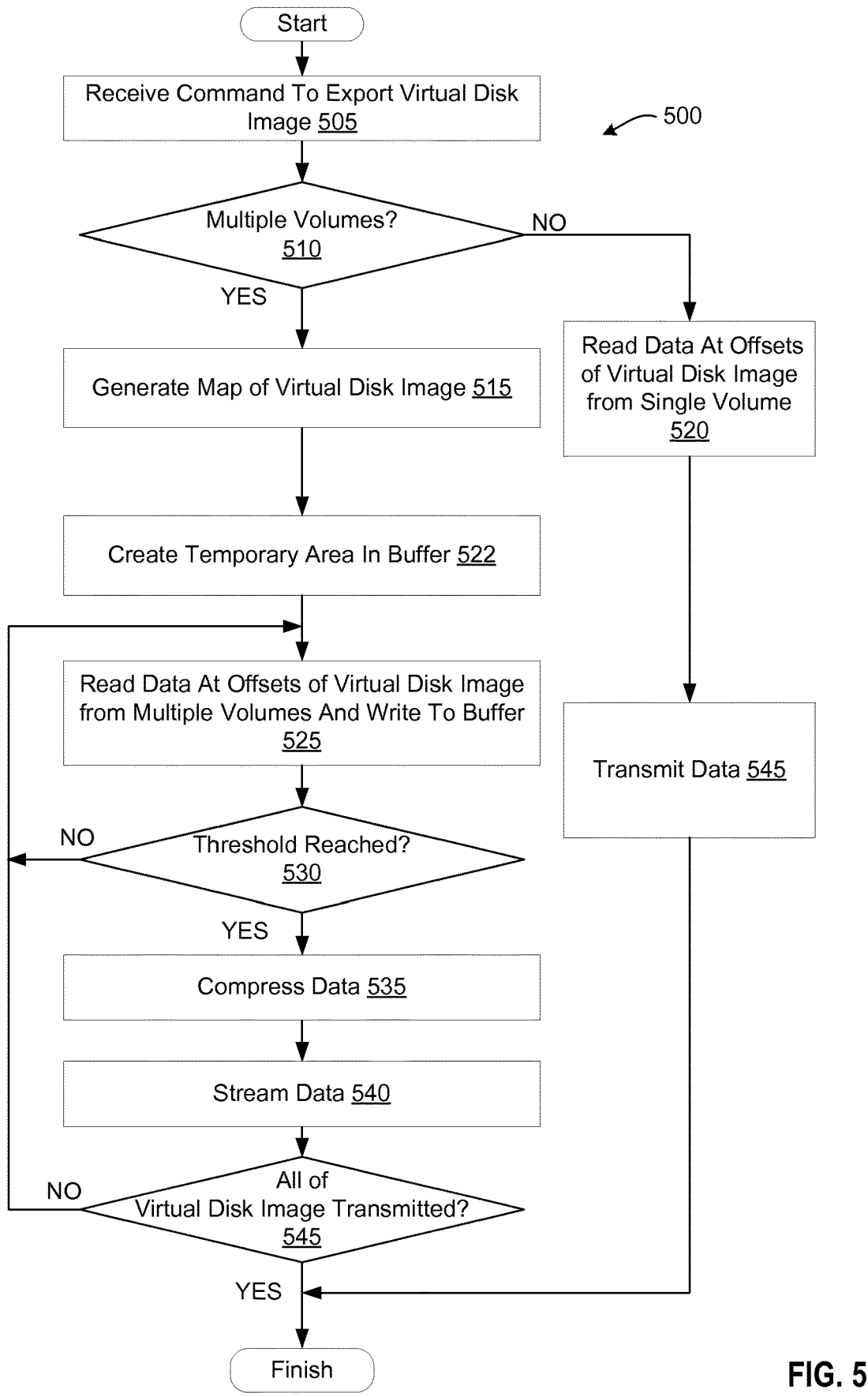
FIG. 5 is a flow diagram illustrating one embodiment for a method of exporting a virtual disk image.
Figure 6:
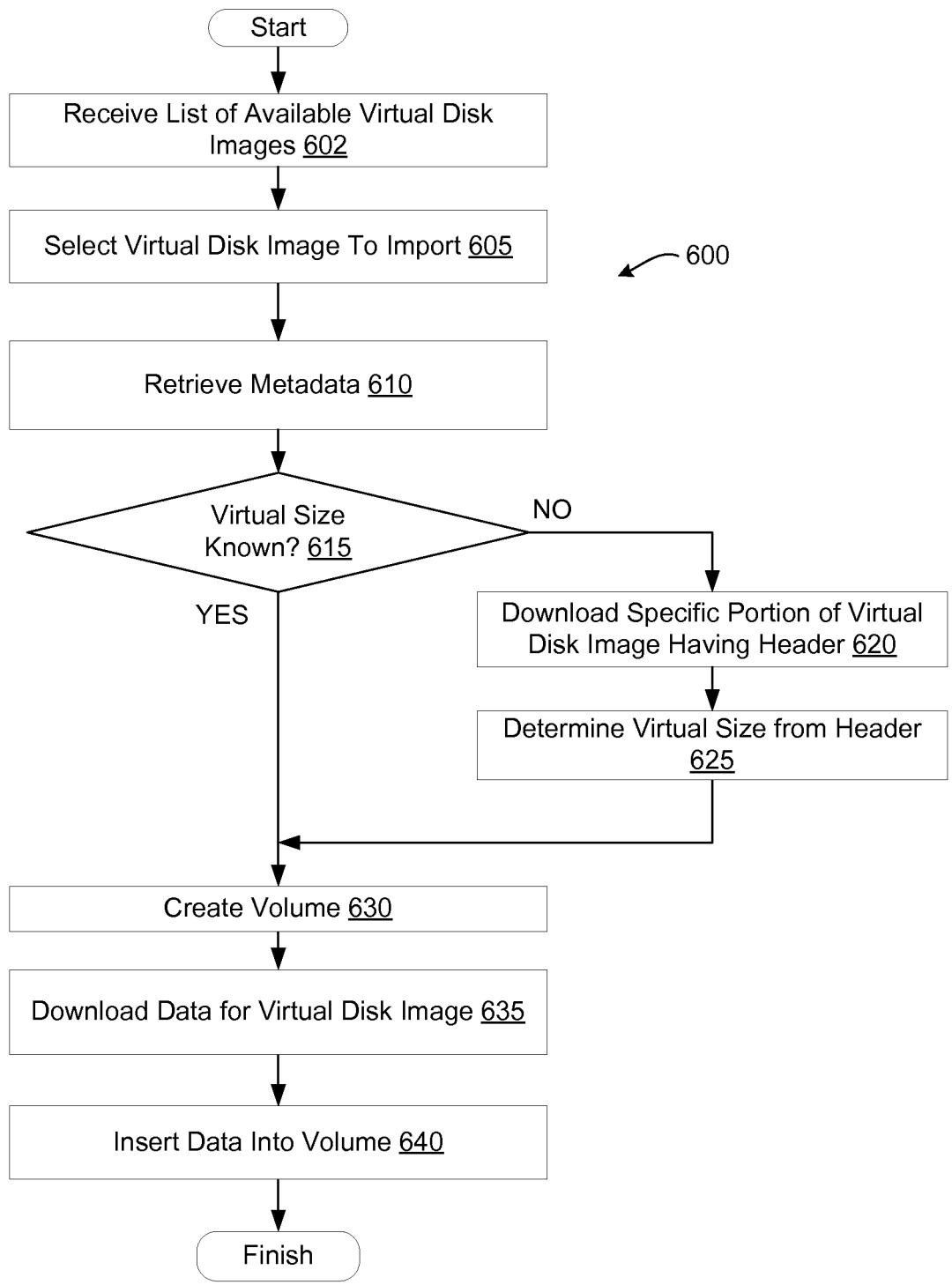
FIG. 6 is a flow diagram illustrating one embodiment for a method of importing a virtual disk image.

FIGS. 5-6 are flow diagrams of various embodiments of methods related to importing and exporting virtual disk images. The methods are performed by processing logic that may include hardware (circuitry, dedicated logic, etc.), software (such as is run on a general purpose computer system or a dedicated machine), or a combination of both. In one implementation, the methods may be performed by one or more host machines, such as host machines 103 and 105 of FIG. 1. The methods may be performed, for example, by one or both of a global manager 170 and a node manager 175 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 5 is a flow diagram illustrating one embodiment for a method 500 of exporting a virtual disk image. At block 505 of method 500, processing logic receives a command to export a virtual disk image. The command may be received from an administrator or may be received from a software component that determines virtual disk images to be exported. The command may identify an address of a remote server to export the virtual disk image to. The command may also identify the virtual disk image using one or more of a storage pool identifier that identifies a storage pool in which the virtual disk image is located, a storage domain identifier that identifies a storage domain within the storage pool, an image identifier that identifies the virtual disk image, and/or a volume identifier that identifies which version of the virtual disk image to be exported.

At block 510, processing logic determines whether the virtual disk image contains multiple volumes that a selected volume depends on. If the virtual disk image does not contain multiple volumes that a selected volume depends on (e.g., if a selected volume is a base volume or if snapshotting is not used), then the method proceeds to block 520 and data for all offsets of the virtual disk image is read from a single identified volume. The single volume may be transmitted to the remote server at block 545.

If at block 510 processing logic determines that a selected volume depends on one or more other volumes of the virtual disk image, the method proceeds to block 515. At block 515, processing logic generates a map of the virtual disk image. The map identifies, for each offset of the virtual disk image, which volume contains most recent data for that offset.

At block 522, processing logic creates a temporary area in a buffer. The temporary area may have the same format or a different format than the virtual disk image that is to be exported. For example, the temporary area may have a RAW disk format, and the virtual disk image to be exported may have a QCOW2 format. Accordingly, the disk format for the virtual disk image may be converted to a new disk format as part of the export process. Data for the virtual disk image will be written from the several volumes into the temporary area in the buffer so as to create a single representation of the data.

At block 525, processing logic reads data at offsets of the virtual disk image from the multiple volumes and writes the data to the temporary area in the buffer. Processing logic may use the map to determine which volumes to read from for specific offsets. Alternatively, processing logic may search the volumes in descending order to identify which volume contains the most current data for each offset. If data for an offset is found in the last volume, then the data is read from the last volume. If the data for the offset is not in the last volume, then the second to last volume is searched. If the data for the offset is not in the second to last volume, then the previous volume is searched for the data, and so on. Such searches may be performed for each offset in ascending order starting from offset zero and continuing until all data from all offsets of the virtual disk image has been read.

At block 530, processing logic determines whether a threshold amount of data has been added to the temporary area in the buffer. The threshold may correspond to the buffer size. In one embodiment, the threshold is 1 MB. Other example thresholds include 512 kB, 5 MB, 10 MB, 1 GB, and so on. If the threshold has not been reached, the method returns to block 530. If the threshold has been reached, the method continues to block 535.

At block 535, processing logic compresses the data in the buffer. At block 540, processing logic then transmits the data. As data is compressed at block 535 and streamed at block 540 the operations of block 525 continue to be performed so that additional data is added to the buffer to be compressed and streamed. At block 545, processing logic determines whether the entire virtual disk image has been transmitted. If so, the method ends. If there is remaining data for the virtual disk image that has not been transmitted, the method returns to block 525. Block 530 may then be skipped after reading remaining data in some instances. This continues until all data for the virtual disk image has been streamed to the server. Thus, data for at least a portion of the offsets is transmitted prior to data for all of the offsets being read and written to the temporary area in the buffer. Once the complete virtual disk image has been transmitted to the server, the method ends.

FIG. 6 is a flow diagram illustrating one embodiment for a method 600 of importing a virtual disk image. At block 602 of method 600 processing logic receives a list of available virtual disk images. The virtual disk images may be provided by a remote server. At block 605, processing logic selects an available virtual disk image to import. The virtual disk image may be selected based on user input or automatically based on image selection rules. Image selection rules may select images based on time stamps, names, size, or other metadata associated with the virtual disk images.

At block 610, processing logic retrieves metadata for the selected virtual disk image. At block 615, processing logic determines whether the retrieved metadata includes a virtual size or enough information to determine a virtual size of the virtual disk image. If the virtual size is not discernible based on the retrieved metadata, the method continues to block 630. If the virtual size is discernible, the method continues to block 620.

At block 620, processing logic downloads a specific portion of the virtual disk image, where the specific portion contains a header for the virtual disk image. At block 625, processing logic then determines a virtual size of the virtual disk image from the header. The method then continues to block 630.

At block 630, processing logic creates a volume for the virtual disk image. The received metadata about the virtual disk image and/or the determined virtual size may be used to generate the volume. At block 635, processing logic downloads the data for the virtual disk image from the server. At block 640, processing logic inserts the downloaded data into the volume. In one embodiment, the data is downloaded directly into the volume.

Figure 7:
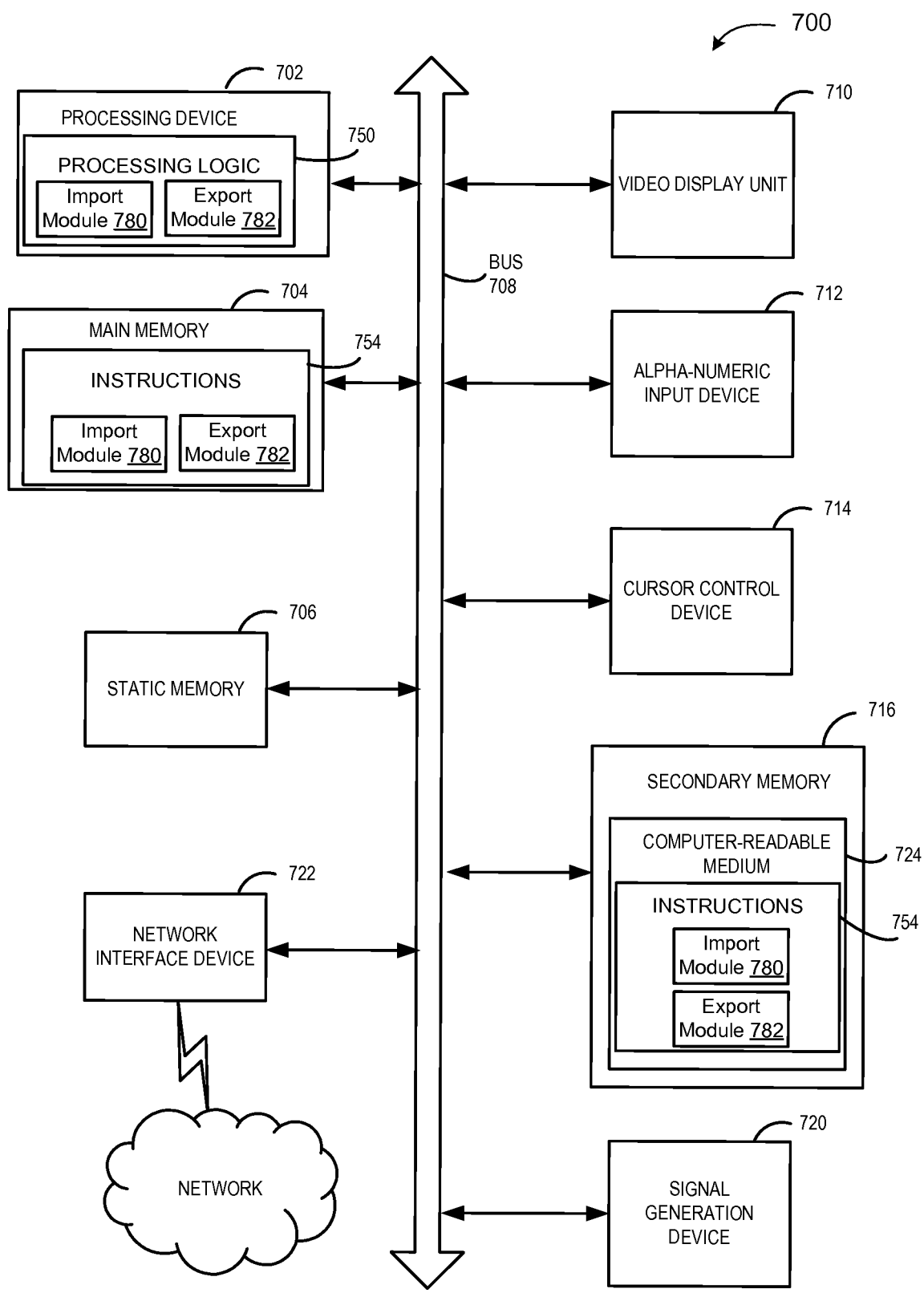
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. The computer system 700 may correspond to a host machine 103 or 105 of FIG. 1 and/or a host machine 200 of FIG. 2. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 708.

The processing device 702 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions 754 embodying any one or more of the methodologies or functions described herein (e.g., import module 780 and/or export module 782). The instructions 754 may also reside, completely or at least partially, within the main memory 704 and/or within the processing device 702 during execution thereof by the computer system 700; the main memory 704 and the processing device 702 also constituting machine-readable storage media.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a transitory medium such as a carrier wave that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "determining", "using", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, a first command to export a first virtual disk image to a server, wherein the first virtual disk image comprises a plurality of volumes that comprise a read-only base volume and at least one additional volume that comprises changes to the base volume;
    generating, by the processing device, an area for the first virtual disk image;
    receiving a map of the first virtual disk image that identifies offsets of the first virtual disk image and, for each of the offsets, a particular volume of the plurality of volumes that comprises data for the offset, and wherein each of the offsets corresponds to a different portion of the first virtual disk image and the map identifies the particular volume for each offset that comprises most recent data for the different portion of the first virtual disk image;
    writing, by the processing device, data for the offsets of the first virtual disk image that has been read from the particular volumes of the plurality of volumes of the first virtual disk image to the area to consolidate the plurality of volumes of the first virtual disk image into a single volume of the first virtual disk image, and wherein the single volume is converted to a different disk format than the plurality of volumes of the first virtual disk image, and wherein the different disk format is associated with a different virtual size relative to a size of the first virtual disk image than the plurality of volumes of the first virtual disk; and
    transmitting, by the processing device, the data of the single volume of the first virtual disk image comprising data read from the particular volumes of the plurality of volumes to the server.

2. The method of claim 1, wherein the area is generated in a buffer, the method further comprising:
    compressing the data in the area responsive to an amount of data in the buffer reaching a threshold;
    wherein transmitting the data to the server comprises streaming the compressed data to the server.

3. The method of claim 1, wherein the server comprises a hypertext transport protocol (HTTP) server.

4. The method of claim 1, wherein the at least one additional volume comprises a read-write volume that is a snapshot of at least one of the base volume or of another volume.

5. The method of claim 1, wherein the offsets are read in ascending order from a first to a last offset, and wherein the data for at least a portion of the offsets is transmitted prior to the data for all of the offsets being read.

6. The method of claim 1, further comprising:
    receiving a second command to import a second virtual disk image from the server;
    retrieving metadata of the second virtual disk image from the server;
    creating a new volume for the second virtual disk image;
    downloading data for the second virtual disk image; and
    inserting the data for the second virtual disk image into the new volume.

7. The method of claim 6, wherein the second virtual disk image has an image size that corresponds to a file size of the second virtual disk image and a virtual size that corresponds to a disk size that is read by guest software that runs in the second virtual machine, the method further comprising:
  downloading a specific portion of the virtual disk image that comprises a header;
  reading the header in the specific portion of the virtual disk image to determine the virtual size; and
    using the virtual size and the image size for the new volume.

8. A non-transitory computer readable storage medium having instructions that, when executed by a processing device, cause the processing device to:
  receive, by the processing device, a first command to export a first virtual disk image to a server, wherein the first virtual disk image comprises a plurality of volumes that comprise a read-only base volume and at least one additional volume that comprises changes to the base volume;
  generate, by the processing device, an area for the first virtual disk image;
  receive a map of the first virtual disk image that identifies offsets of the first virtual disk image and, for each of the offsets, a particular volume of the plurality of volumes that comprises data for the offset;
  write, by the processing device, data for the offsets of the first virtual disk image that has been read from the particular volumes of the plurality of volumes of the first virtual disk image to the area to consolidate the plurality of volumes of the first virtual disk image into a single volume of the first virtual disk image, and wherein each of the offsets corresponds to a different portion of the first virtual disk image and the map identifies the particular volume for each offset that comprises most recent data for the different portion of the first virtual disk image, and wherein the single volume is converted to a different disk format than the plurality of volumes of the first virtual disk image, and wherein the different disk format is associated with a different virtual size relative to a size of the first virtual disk image than the plurality of volumes of the first virtual disk; and
  transmit, by the processing device, the data of the single volume of the first virtual disk image comprising data read from the particular volumes of the plurality of volumes to the server.

9. The non-transitory computer readable storage medium of claim 8, wherein the area is generated in a buffer, the processing device is further to:
  compress the data in the area responsive to an amount of data in the buffer reaching a threshold, wherein to transmit the data to the server, the processing device is further to stream the compressed data to the server.

10. The non-transitory computer readable storage medium of claim 8, wherein the server comprises a hypertext transport protocol (HTTP) server.

11. The non-transitory computer readable storage medium of claim 8, wherein the at least one additional volume comprises a read-write volume that is a snapshot of at least one of the base volume or of another volume.

12. The non-transitory computer readable storage medium of claim 8, wherein the offsets are read in ascending order from a first to a last offset, and wherein the data for at least a portion of the offsets is transmitted prior to the data for all of the offsets being read.

13. The non-transitory computer readable storage medium of claim 8, the processing device further to:
  receive a second command to import a second virtual disk image from the server;
  retrieve metadata of the second virtual disk image from the server;
  create a new volume for the second virtual disk image;
  download data for the second virtual disk image; and
  insert the data for the second virtual disk image into the new volume.

14. The non-transitory computer readable storage medium of claim 13, wherein the second virtual disk image has an image size that corresponds to a file size of the second virtual disk image and a virtual size that corresponds to a disk size that is read by guest software that runs in the second virtual machine, the processing device further to:
  download a specific portion of the virtual disk image that comprises a header;
    read the header in the specific portion of the virtual disk image to determine the virtual size; and
    use the virtual size and the image size for the new volume.

15. A computing device comprising:
  a memory to store a first virtual disk image; and
  a processing device, operatively coupled to the memory, wherein the processing device is to:
  receive a first command to export the first virtual disk image to a server, wherein the first virtual disk image comprises a plurality of volumes that comprise a read-only base volume and at least one additional volume that comprises changes to the base volume;
  generate an area for the first virtual disk image in a buffer;
  receive a map of the first virtual disk image that identifies offsets of the first virtual disk image and, for each of the offsets, a particular volume of the plurality of volumes that comprises data for the offset;
  write data for the offsets of the first virtual disk image that has been read from particular volumes of the plurality of volumes of the first virtual disk image to the area in the buffer to consolidate the plurality of volumes of the first virtual disk image into a single volume of the first virtual disk image, and wherein each of the offsets corresponds to a different portion of the first virtual disk image and the map identifies the particular volume for each offset that comprises most recent data for the different portion of the first virtual disk image, and wherein the single volume is converted to a different disk format than the plurality of volumes of the first virtual disk image, and wherein the different disk format is associated with a different virtual size relative to a size of the first virtual disk image than the plurality of volumes of the first virtual disk;
  compress the data of the single volume of the first virtual disk image in the area in the buffer; and
  stream the compressed data of the single volume of the first virtual disk image comprising data read from the particular volumes of the plurality of volumes to the server.

16. The computing device of claim 15, wherein the processing device is further to:
  receive a second command to import a second virtual disk image from the server;
  retrieve metadata of the second virtual disk image from the server;
  create a new volume for the second virtual disk image;
  download data for the second virtual disk image; and
  insert the data for the second virtual disk image into the new volume.

17. The computing device of claim 16, wherein the second virtual disk image has an image size that corresponds to a file size of the second virtual disk image and a virtual size that corresponds to a disk size that is read by guest software that runs in the second virtual machine, and wherein the processing device is further to:

download a specific portion of the virtual disk image that comprises a header;

read the header in the specific portion of the virtual disk image to determine the virtual size; and use the virtual size and the image size for the new volume.

\* \* \* \* \*